United States Patent [19]

Asai et al.

[11] Patent Number: 5,032,336
[45] Date of Patent: Jul. 16, 1991

[54] PROCESS FOR PRODUCING AROMATIC POLYSULFONE MOLDING COMPOUND IMPROVED IN MOLD-RELEASE CHARACTERISTICS

[75] Inventors: Kuniaki Asai, Tondabayashi; Kazuo Hieda, Nishinomiya, both of Japan

[73] Assignee: Sumitomo Chemical Company, Limited, Osaka, Japan

[21] Appl. No.: 442,628

[22] Filed: Nov. 29, 1989

[30] Foreign Application Priority Data

Dec. 19, 1988 [JP] Japan .................. 63-319732

[51] Int. Cl.$^5$ .............. B29B 15/00; B29C 47/00; C08J 3/22; C08L 81/06
[52] U.S. Cl. .......................... 264/141; 264/211; 264/300; 524/399; 524/400; 524/609
[58] Field of Search .......... 264/141, 211, 300, 331.12, 264/349, 140; 524/394, 398, 399, 400, 609; 523/351

[56] References Cited

FOREIGN PATENT DOCUMENTS 60-149629  8/1985  Japan .
63-264667 11/1988  Japan .

*Primary Examiner*—Leo B. Tentoni
*Attorney, Agent, or Firm*—Stevens, Davis, Miller & Mosher

[57] ABSTRACT

A process for producing an aromatic polysulfone molding compound improved in mold-release characteristics by adding a predetermined amount of metal soap to aromatic polysulfone resin, wherein pellets composed of an aromatic polysulfone resin and a specific amount of metal soap, and otherwise similar pellets but containing no metal soap are prepared separately by melt-mixing, and these two kinds of pellets are dry-blended together so as to satisfy a predetermined condition.

8 Claims, No Drawings

PROCESS FOR PRODUCING AROMATIC POLYSULFONE MOLDING COMPOUND IMPROVED IN MOLD-RELEASE CHARACTERISTICS

BACKGROUND OF THE INVENTION

1. Field of the Invention

The present invention relates to a process for producing an aromatic polysulfone molding compound improved in mold-release characteristics.

2. Description of the Prior Art

Aromatic polysulfone resins are in use as engineering plastics superior in heat resistance, strength, stiffness, creep resistance, and flame retardance for electric and electronic components as well as for office automation equipment parts, automobile parts, etc. Recently, technical progress in the electronic field has been remarkable, electronic components, e.g. relays, switches, connectors, sockets, and coil bobbins, have been miniaturized, made thinner in wall, or sophisticated, and their high dimensional accuracy and high heat resistance have been required.

Aromatic polysulfone resins show low mold shrinkage because they are amorphous. The deterioration of properties such as strengths and modulus of elasticity are less, up to higher temperature, than those of high temperature resistant resins like polyphenylene sulfide and polyetherketone, because the glass transition points of aromatic polysulfone resins are higher than those of said high temperature resistant resins. Hence, aromatic polysulfone resins are materials fitted for electronic components which are required to have high dimensional accuracy and high heat resistance. In particular, the incorporation of a fibrous material such as glass fiber, silica-alumina fiber, or wollastonite into aromatic polysulfone resins further lowers their mold shrinkage and improves their strengths and modulus of elasticity, making them more fitted for electronic components. However, injection molding of aromatic polysulfone resins requires high pressure because of their relatively high melt viscosities and this, jointly with their low mold shrinkage, makes it very difficult to release their molded parts from mold cavities when electronic parts of small sizes and complicate shapes or those having thin-wall portions are injection molded, where sufficient draft cannot be taken. Hence, none of products with high dimensional accuracy can be molded in such cases. This is also quite true in the case of blends of aromatic polysulfone resins with such fibrous fillers as mentioned above.

A known means for solving this problem is to add metal soaps to aromatic polysulfone resins. For example, Japanese Patent Application Kokai (Laid-Open) No. 63-264667 proposes a molding compound produced by melt mixing 100 parts by weight of an aromatic polysulfone resin with 0.02-5 parts by weight of a metal soap. Although superior in mold release characteristics, this molding compound involves a problem in that the addition of metal soap causes considerable deteriorations of mechanical properties, such as tensile strength, flexural strength, and Izod impact strength, of moldings produced.

Japanese Patent Application Kokai (Laid-Open) No. 60-149629 also proposes the method of sticking 200-1000 ppm of a metal soap on the surface of pellets or particles of an aromatic polysulfone resin and subjecting the resulting composition to injection molding. In this case, the metal soap does not adversely affect the performance characteristics of the moldings, since the amount of metal soap is less than that in the molding compound of the former patent application and the soap, having heat history only once, undergoes practically no change such as decomposition. However, this method has a drawback in that at the time of molding, these pellets slip and hence the chargeability of pellets is much worse, thus stable molding being impossible.

SUMMARY OF THE INVENTION

It is an object of the present invention to provide a process for producing aromatic polysulfone molding compounds improved in mold-release characteristics which solves problems such as the above noted deterioration of mechanical properties and unstable moldability.

The present inventors made intensive studies in order to solve the above problems and as a result, have found it to be effective for achieving the above object that in the production of molding compounds improved in mold-release characteristics by adding a specific amount of metal soap to aromatic polysulfone resins, pellets composed of an aromatic polysulfone resin and a specific amount of metal soap and similar pellets but containing no metal soap are prepared separately by melt mixing and these two kinds of pellets are dry-blended together so as to satisfy a specific condition.

The aromatic polysulfone molding compound produced according to the process of the present invention, when injection molded, exhibits superior mold-release characteristics and yields molding products with the inherent mechanical properties scarcely deteriorated and without raising problem in appearance, hence, being very useful as a material for precision molded parts including electronic components.

That is, the present invention involves a process for producing an aromatic polysulfone molding compound improved in mold-release characteristics which contains 0.02–0.3 part by weight of a metal soap per 100 parts by weight of an aromatic polysulfone resin, the process comprising the steps of;

(1) forming separately aromatic polysulfone resin pellets A and pellets B for molding purposes through melt mixing, the pellets A containing 0.3–1 part by weight of the metal soap per 100 parts by weight of the aromatic polysulfone resin but the pellets B containing no metal soap; and (2) dry-blending pellets A and pellets B together on the condition that the pellets B/pellets A weight ratio is not less than 1 and the resulting blend contains 0.02–0.3 part by weight of the metal soap per 100 parts by weight of the aromatic polysulfone resin.

DESCRIPTION OF THE PREFERRED EMBODIMENTS

The aromatic polysulfone resin used in the present invention is defined as a polyarylene compound in which arylene units together with ether bonds and with sulfone bonds are arranged orderly or disorderly. Typical examples of the aromatic polysulfone resin are those having at least one repeating structural units (1)–(4) shown below.

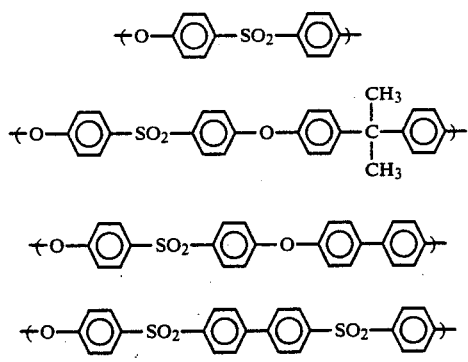

(1)
(2)
(3)
(4)

Of these resins, preferred are resins having structural unit (1). These resins are marketed from Imperial Chemical Industries Ltd. under the tradenames of VICTREX PES 3600P, 4100P, and 4800P.

In the present invention, pellets A and B may be formed to contain a fibrous material, as occasion demands, in an amount of up to 120 parts by weight per 100 parts by weight of the aromatic polysulfone resin. The use of the resulting molding compound is advantageous since it provides molding products with lower shrinkage. Such fibrous materials include glass fiber, silica-alumina fiber, wollastonite, carbon fiber, alumina fiber, and potassium titanate fiber. Of these fibers, particularly favorable are glass fiber, silica-alumina fiber, and wollastonite. These fibers may be used alone or in combination.

Preferred types of glass fibers are generally used as reinforcements for resins. Such glass fibers include a short fiber called milled glass fiber of 50–250 μm filament length and a long fiber called chopped glass fiber of 2–5 mm filament length. The filament diameter of these fibers is generally 13 μm.

Silica-alumina fiber is constituted mainly of $Al_2O_3$ and $SiO_2$. This fiber is generally produced by electrical melting of nearly equal amounts of high-purity silica and alumina, and blowing a fine stream of the melt by high pressure air to break the melt into short, fine filaments, which have generally an average length of 50 to 200 μm and an average diameter of 1.8 to 3.0 μm, which is smaller than that of common glass fiber. The maximum service temperature of silica-alumina fiber is as high as 1260° C. Examples of commercially available silica-alumina fiber are IBIWOOL ® CP-U$_3$ and IBIWOOL ® CP-U$_{11}$ (made by Ibiden Co., Ltd.).

Wollastonite is naturally-occurring calcium metasilicate, which is an acicular mineral having a chemical composition represented by $CaSiO_3$, a specific gravity of 2.9, and a melting point of 1540° C. Wollastonite suitable for use herein has an average filament diameter of 2 to 10 μm and an aspect ratio of 3 to 20. Examples of commercially available wollastonite are NYAD ®G, NYAD ® 400, and NYAD ® 325 (supplied by Nagase Sangyo Co., Ltd.), ASB-3 and KEMORIT ® ASB-3 and KEMORIT ® ASB-4 (supplied by Maruwa Biochemical Co., Ltd.), and TW-HAR-10 (supplied by Tatsumori Co., Ltd.).

Metal soaps for use in the present invention include barium, calcium, zinc, magnesium, aluminum, lithium, and lead salts of fatty acids of 10 to 30 carbon atoms, or mixtures of these salts. Examples of the fatty acids include capric acid, lauric acid, tridecanoic acid pentadecanoic acid, palmitic acid, stearic acid, behenic acid, etc. Of these fatty acid salts, calcium stearate and barium stearate are used most generally.

In the present inventive process for producing aromatic polysulfone molding compounds, the first step of essential operations is melt mixing to prepare separately pellets A for molding composed of 100 parts by weight of said aromatic polysulfone resin, 0.3–1 part by weight of said metal soap, and if necessary, said fibrous material and pellets B for molding which comprises said aromatic polysulfone resin and if necessary, said fibrous material. If the metal soap content in pellets A exceeds 1 part by weight on that basis, such pellets will contain minute foams, hence losing transparency even when containing no fibrous material. If the metal soap content, on the other hand, is less than 0.3 part by weight on that basis, the proportion of pellets A, when they are dry-blended with pellets B so as to provide a molding compound exhibiting good mold-release characteristics, will need to be increased. Products of injection molding of the thus obtained molding compound will have undesirably deteriorated mechanical properties.

The second step of the essential operations is dry-blending pellets A and pellets B together on the condition that the pellets B/pellets A weight ratio is not less than 1 and the resulting blend contains 0.02–0.3 part by weight of the metal soap per 100 parts by weight of the aromatic polysulfone resin. If the dry blending is conducted so that the metal soap content in the resulting blend may be less than 0.02 part by weight on said basis, the mold-release characteristics of the molding compound in injection molding will be practically identical with those of the molding compound containing no metal soap. If the dry blending, on the other hand, is conducted so that the metal soap content may exceed 0.3 part by weight on that basis, products of injection molding of the resulting molding compound will have undesirably deteriorated mechanical properties and the mold-release characteristics of the molding compound are nearly the same with those of the molding compound containing 0.3 part by weight of the metal soap, that is, the mold-release characteristics are little improved when the metal soap content is increased from 0.3 part by weight. Moreover, if the dry blending is conducted in a pellets B/pellets A weight ratio of less than 1, the resulting molding compound, even when the metal soap content therein is within the above defined range of 0.02 to 0.3 part by weight, will provide injection molding products having undesirably-low mechanical strengths, though the molding compound will exhibit good mold-release characteristics and contain no observable foam particle.

As regards the loading amount of fibrous material, brief explanation is made below. No fibrous material needs to be incorporated into molding compounds for applications wherein the transparency of the resulting molded parts is essential. With an increase in the amount of fibrous material in the molding compound, the strengths and modulus of elasticity of the molded parts become more enhanced. However, when the amount of fibrous material exceeds 120 parts by weight per 100 parts by weight of the aromatic polysulfone resin, the melt flow of the molding compound much lowers and in molding of parts complicate in shape or parts having thin-wall portions, it is difficult to fill up to the end portions of mold cavities with the injected melt of the molding compound. Hence, the incorporation of such large amounts of fibrous material is undesirable. It may be noted that whether the same or different kinds and amounts of fibrous material are contained in pellets A and pellets B, the effect of the present invention will not be counteracted thereby, as far as these pellets are prepared and blended on the above defined specific conditions.

There is no particular restriction on the method for preparing pellets A and B in the first step. In general, these pellets are prepared by mixing the abovementioned aromatic polysulfone resin, metal soap (not used for pellets B), and, optionally, the above-mentioned fibrous material in a Henschel mixer, melt-milling the mixture by using an extruder, and pelletizing the extrudate. There is also no particular restriction on the method for dry blending of pellets A and B in the second step. Generally, a tumbler or the like is used for this blending.

In the present invention, the aromatic polysulfone molding compound, as occasion demands, may contain additives selected from: inorganic fillers such as calcium carbonate, talc, mica, clay, and glass beads; colarants such as dyes and pigments; and ultraviolet absorbers and stabilizers, unless impairing the quality of the molding compound or of the molded parts therefrom.

The following examples illustrate the present invention without restricting the scope of the invention. Properties of molding compounds and molded samples in the examples were evaluated in the following ways:
Mold-release resistance:

Cylindrical bushes (inner diameter 11 mm, outer diameter 15 mm, height 15 mm) were molded from aromatic polysulfone molding compounds by using an injection molding machine (SYCAP N110/45, supplied by Sumitomo Heavy Industries, Ltd.) at cylinder temperatures of 330° to 360° C. and mold temperatures of 130° to 150° C. and the mold-release resistance at the time of releasing each molded part from the mold was measured with a pressure sensor fitted on the ejector pin. The found mold-release resistance of each molding compound was expressed in terms of the percentage (%) based on the mold-release resistance of a molding compound of the same composition but containing no metal soap. After releasing from the mold, the appearance of each molded part was observed visually. Tensile strength and flexural strength:

Tensile-test pieces and bending-test pieces were molded
under the same conditions as in the molding of the above cylindrical bushes, and were tested for tensile strength and flexural strength in accordance with ASTM D-638 and D-790, respectively.

EXAMPLE 1-4 AND COMPARATIVE EXAMPLES 1-3

100 Parts by weight of a powdery aromatic polysulfone resin (tradename: VICTREX PES 4100P, made by Imperial Chemical Industries Ltd.) and 0.5 part by weight of barium stearate were blended together in a Henschel mixer, and pelletized by using a twin-screw extruder (Model PCM-30, supplied by Ikegai Iron Works, Ltd.) at cylinder temperatures of 330° to 350° C., giving pellets A. In the same manner, pellets B were formed from the same polysulfone resin alone. Pellets A and pellets B were blended in varying weight ratios of 19/1, 9/1, 4/1, 1.5/1, 49/1, and 1/1.5, as shown in Table 1, by using a tumbler mixer, preparing aromatic polysulfone molding compounds of 0.025, 0.05, 0.1, 0.2, 0.001, and 0.3 part by weight metal soap contents per 100 parts by weight of the aromatic polysulfone resin. These six groups of molding compounds and a molding compound consisting of said aromatic polysulfone pellets alone were injection molded separately according to the above stated procedure to evaluate the mold-release resistance of each molding compound and the appearance, tensile strength, and flexural strength of molded pieces of each group. Results of the evaluation are shown in Table 1. Thus, the aromatic polysulfone molding compounds (Examples 1-4) obtained according to the process of the present invention, as compared with the molding compound (Comparative Example 1) consisting of the polysulfone resin alone, were improved in mold-release characteristics and provided molded pieces good in appearance without lowering any of the strengths. In contrast, the molding compound (Comparative Example 2) containing less than 0.02 part by weight of the metal soap per 100 parts by weight of the polysulfone resin was little improved in mold-release characteristics and the molding compound (Comparative Example 3) prepared by blending pellets A and pellets B together in a ratio departing from the condition of the pellets B/pellets A weight ratio $\geq 1$ gave molded pieces showing lowered tensile strength and flexural strength.

COMPARATIVE EXAMPLE 4

According to the procedure of Example 1, pellets A containing 0.8 part by weight of barium stearate were formed and blended with pellets B in a pellets B/pellets A weight ratio of 1/1 to prepare a molding compound in which the content of barium stearate was 0.4 part by weight. This molding compound was injection molded, with the result that lowering in the strengths of molded pieces was observed as shown in Table 1.

COMPARATIVE EXAMPLES 5 AND 6

Pellets of two groups containing severally 0.1 and 0.7 part by weight of barium stearate per 100 parts by weight of said aromatic polysulfone resin were formed and subjected directly to injection molding. As shown in Table 1, the molding compound (Comparative Example 5) containing 0.1 part by weight of barium stearate gave molded pieces which were lower in the strengths than the pieces molded in Example 3 and the molding compound (Comparative Example 6) containing 0.7 part by weight of barium stearate gave molded pieces containing minute foams, were translucent.

EXAMPLES 5-8

According to the procedure of Example 1, aromatic polysulfone resin pellets containing 0.8 part by weight each of different metal soaps shown in Table 1 were formed, and pellets A containing each metal soap and pellets B (the same as used in Example 1) were blended together in a pellets B/pellets A weight ratio of 3/1, thereby preparing aromatic polysulfone molding compounds containing severally 0.2 part by weight of different metal soaps. These molding compounds were injection molded separately, with the result that, as shown in Table 1, their mold-release characteristics were improved and the appearance of molded pieces was good and lowering in the strengths of these pieces was not observed.

EXAMPLES 9-14 AND COMPARATIVE EXAMPLES 7-14

Tests were conducted in the same manner as in Example 1 but molding compounds were prepared by using a powdery aromatic polysulfone resin (tradename: VICTREX PES 3600P, made by Imperial Chemical Industries Ltd.), glass fibers (tradename: MAPX 1, made by Asahi Fiber Glass Co., Ltd.), and barium stearate in amounts shown in Table 2. Results of the tests are shown in Table 2. Aromatic polysulfone molding compounds prepared according to the process of the present invention exhibited improved mold-release characteristics and gave molded pieces good in appearance without lowering their strengths. Thus, these molding compounds are superior distinctly to those prepared in Comparative Examples 7-14 on conditions departing from the scope of the present invention.

EXAMPLES 15-18 AND COMPARATIVE EXAMPLES 15-20

Tests were conducted in the same manner as in Example 1 but molding compounds were prepared by using a powdery aromatic polysulfone resin (the same as used in the preceding Examples), wollastonite (tradename: NYAD G, supplied by Nagase Sangyo Co., Ltd.) in certain case and a silica-alumina fiber (tradename: IBIWOOL CP-$U_3$, made by Ibiden Co., Ltd.) in the other cases, and calcium stearate in amounts shown in Table 3. Results of the tests are shown in Table 3. Aromatic polysulfone molding compounds prepared according to the process of the present invention exhibited improved mold-release characteristics and gave molded pieces good in appearance without lowering their strengths. Thus, these molding compounds are superior distinctly to those prepared on conditions departing from the scope of the present invention.

TABLE 1

| | Composition of molding compound | | | | Metal soap content in pellets A (part by wt.) | Pellets B/ pellets A mixing ratio by weight | Properties of molded pieces | | | |
|---|---|---|---|---|---|---|---|---|---|---|
| | Aromatic polysulfone | | Metal soap | | | | | | | |
| | Type | Amount (part by wt.) | Spacies | Amount (part by wt.) | | | Mold-release resistance (%) | Appearance | Tensile strength (kg/cm$^2$) | Flexural strength (kg/cm$^2$) |
| Comp. Example 1 | 4100P | 100 | — | — | — | — | 100 | Good | 850 | 1320 |
| Example 1 | " | 100 | Ba-stearate | 0.025 | 0.5 | 19/1 | 88 | " | 860 | 1320 |
| Example 2 | " | 100 | " | 0.05 | 0.5 | 9/1 | 71 | " | 840 | 1310 |
| Example 3 | " | 100 | " | 0.1 | 0.5 | 4/1 | 56 | " | 840 | 1290 |
| Example 4 | " | 100 | " | 0.2 | 0.5 | 1.5/1 | 42 | " | 830 | 1270 |
| Comp. Example 2 | " | 100 | " | 0.001 | 0.5 | 49/1 | 99 | " | 850 | 1330 |
| Comp. Example 3 | " | 100 | " | 0.3 | 0.5 | 1/1.5 | 38 | " | 700 | 1120 |
| Comp. Example 4 | " | 100 | " | 0.4 | 0.8 | 1/1 | 36 | " | 620 | 1030 |
| Comp. Example 5 | " | 100 | " | 0.1 | 0.1 | — | 58 | " | 720 | 1150 |
| Comp. Example 6 | " | 100 | " | 0.7 | 0.7 | — | 34 | Translucent foaming | 580 | 960 |
| Example 5 | 4100P | 100 | Ba-stearate | 0.2 | 0.8 | 3/1 | 40 | Good | 840 | 1270 |
| Example 6 | " | 100 | Ca-stearate | 0.2 | 0.8 | 3/1 | 43 | " | 830 | 1260 |
| Example 7 | " | 100 | Mg-stearate | 0.2 | 0.8 | 3/1 | 42 | " | 840 | 1260 |
| Example 8 | " | 100 | Zn-stearate | 0.2 | 0.8 | 3/1 | 40 | " | 840 | 1280 |

TABLE 2

| | Composition of molding compound | | | | | | Metal soap content in pellets A (part by wt.) |
|---|---|---|---|---|---|---|---|
| | Aromatic polysulfone | | Fibrous material | | Metal soap | | |
| | Type | Amount (part by wt.) | Spacies | Amount (part by wt.) | Spacies | Amount (part by wt.) | |
| Compar. Example 7 | 3600P | 100 | Glass fiber | 25 | — | — | — |
| Example 9 | " | 100 | " | 25 | Ba-stearate | 0.025 | 0.5 |
| Example 10 | " | 100 | " | 25 | " | 0.05 | 0.5 |
| Example 11 | " | 100 | " | 25 | " | 0.1 | 0.5 |
| Example 12 | " | 100 | " | 25 | " | 0.2 | 0.5 |
| Compar. Example 8 | " | 100 | " | 25 | " | 0.001 | 0.5 |
| Compar. Example 9 | " | 100 | " | 25 | " | 0.3 | 0.5 |
| Compar. Example 10 | " | 100 | " | 25 | " | 0.4 | 0.8 |
| Compar. Example 11 | " | 100 | " | 25 | " | 0.2 | 0.2 |
| Compar. Example 12 | " | 100 | " | 25 | " | 0.7 | 0.7 |
| Compar. Example 13 | " | 100 | " | 43 | — | — | — |
| Example 13 | " | 100 | " | 43 | Ba-stearate | 0.1 | 0.5 |
| Compar. Example 14 | " | 100 | " | 80 | — | — | — |
| Example 14 | " | 100 | " | 80 | Ba-stearate | 0.1 | 0.5 |

Pellets B/ pellets A    Properties of molded pieces

TABLE 2-continued

|  | mixing ratio by weight | Mold-release resistance (%) | Appearance | Tensile strength (kg/cm$^2$) | Flexural strength (kg/cm$^2$) |
| --- | --- | --- | --- | --- | --- |
| Compar. Example 7 | — | 100 | Good | 1290 | 1740 |
| Example 9 | 19/1 | 87 | " | 1280 | 1730 |
| Example 10 | 9/1 | 66 | " | 1260 | 1700 |
| Example 11 | 4/1 | 51 | " | 1250 | 1690 |
| Example 12 | 1.5/1 | 35 | " | 1220 | 1630 |
| Compar. Example 8 | 49/1 | 100 | " | 1300 | 1730 |
| Compar. Example 9 | 1/1.5 | 33 | " | 1110 | 1520 |
| Compar. Example 10 | 1/1 | 32 | " | 1030 | 1410 |
| Compar. Example 11 | — | 36 | " | 1050 | 1450 |
| Compar. Example 12 | — | 36 | Foamy | 900 | 1230 |
| Compar. Example 13 | — | 100 | Good | 1430 | 1930 |
| Example 13 | 4/1 | 52 | " | 1400 | 1880 |
| Compar. Example 14 | — | 100 | " | 1720 | 2250 |
| Example 14 | 4/1 | 56 | " | 1680 | 2200 |

TABLE 3

| | Composition of molding compound ||||||
| --- | --- | --- | --- | --- | --- | --- |
| | Aromatic polysulfone || Fibrous material || Metal soap || Metal soap content in pellets A (part by wt.) |
| | Type | Amount (part by wt.) | Spacies | Amount (part by wt.) | Spacies | Amount (part by wt.) | |
| Compar. Example 15 | 3600P | 100 | Wollastonite | 100 | — | — | — |
| Example 15 | " | 100 | " | 100 | Ca-stearate | 0.1 | 0.5 |
| Example 16 | " | 100 | " | 100 | " | 0.2 | 0.5 |
| Compar. Example 16 | " | 100 | " | 100 | " | 0.4 | 0.8 |
| Compar. Example 17 | " | 100 | " | 100 | " | 0.2 | 0.2 |
| Compar. Example 18 | 3600P | 100 | Silica-alumina fiber | 80 | — | — | — |
| Example 17 | " | 100 | Silica-alumina fiber | 80 | Ca-stearate | 0.1 | 0.5 |
| Example 18 | " | 100 | Silica-alumina fiber | 80 | " | 0.2 | 0.5 |
| Compar. Example 19 | 3600P | 100 | Silica-alumina fiber | 80 | Ca-stearate | 0.4 | 0.8 |
| Compar. Example 20 | " | 100 | Silica-alumina fiber | 80 | " | 0.2 | 0.2 |

| | Pellets B/ pellets A mixing ratio by weight | Properties of molded pieces ||||
| --- | --- | --- | --- | --- | --- |
| | | Mold-release resistance (%) | Appearance | Tensile strength (kg/cm$^2$) | Flexural strength (kg/cm$^2$) |
| Compar. Example 15 | — | 100 | Good | 690 | 1200 |
| Example 15 | 4/1 | 62 | " | 680 | 1180 |
| Example 16 | 1.5/1 | 43 | " | 660 | 1150 |
| Compar. Example 16 | 1/1 | 41 | " | 520 | 950 |
| Compar. Example 17 | — | 48 | " | 550 | 960 |
| Compar. Example 18 | — | 100 | Good | 1560 | 1730 |
| Example 17 | 4/1 | 55 | " | 1530 | 1710 |
| Example 18 | 1.5/1 | 43 | " | 1500 | 1750 |
| Compar. Example 19 | 1/1 | 40 | Good | 1230 | 1380 |
| Compar. Example 20 | — | 45 | " | 1260 | 1400 |

What is claimed is:

1. A process for producing an aromatic polysulfone molding compound improved in mold-release characteristics which contains 0.02–0.3 part by weight of a metal soap per 100 parts by weight of an aromatic polysulfone resin, the process comprising the steps of:

forming separately aromatic polysulfone resin pellets A and pellets B for molding purposes through melt mixing, the pellets A containing 0.3-1 part by weight of the metal soap per 100 parts by weight of the aromatic polysulfone resin but the pellets B containing no metal soap; and dry-blending pellets A and pellets B together on the condition that the pellets B/pellets A weight ratio is not less than 1 and the resulting blend contains 0.02-0.3 part by weight of the metal soap per 100 parts by weight of the aromatic polysulfone resin.

2. A process according to claim 1, wherein the pellets A are prepared by melt mixing 100 parts by weight of the aromatic polysulfone resin, 0.3-1.0 part by weight of the metal soap and, optionally up to 120 parts by weight of fibrous materials.

3. A process according to claim 1, wherein the pellets B are prepared by melt mixing the aromatic polysulfone and optionally up to 120 parts by weight of fibrous materials per 100 parts by weight of the aromatic polysulfone resin.

4. A process according to claim 1, wherein the aromatic polysulfone resin has at least one of the following repeating structural units (1)-(4):

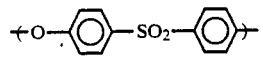
(1)

-continued

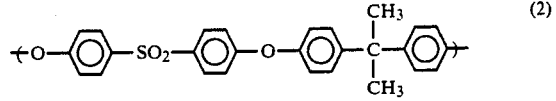
(2)

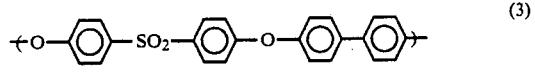
(3)

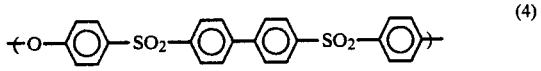
(4)

5. A process according to claim 4, wherein the aromatic polysulfone has the following repeating structural unit:

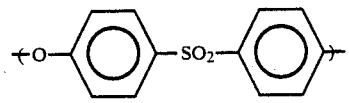

6. A process according to claim 1, wherein the metal soap is barium, calcium, zinc, magnesium, aluminum, lithium, or lead salt of fatty acids of 10 to 30 carbon atoms, or mixtures thereof.

7. A process according to claim 1, wherein the pellets A and B contain fibrous material in an amount of up to 120 parts by weight per 100 parts by weight of the aromatic polysulfone resin.

8. A process according to claim 7, wherein the fibrous material is glass fiber, silica-alumina fiber, wollstonite, carbon fiber, alumina fiber, or potassium titanate fiber.

* * * * *